(12) United States Patent　　(10) Patent No.: US 12,257,197 B2
Pitt　　(45) Date of Patent: Mar. 25, 2025

(54) APPARATUS FOR SEATING A PERSON IN AN OBSTRUCTED SEAT

(71) Applicant: Roma Medical Aids Limited, Bridgend (GB)

(72) Inventor: John Pitt, Bridgend (GB)

(73) Assignee: Roma Medical Aids Limited, Bridgend (GB)

( * ) Notice: Subject to any disclaimer, the term of this patent is extended or adjusted under 35 U.S.C. 154(b) by 749 days.

(21) Appl. No.: 17/426,541

(22) PCT Filed: Jan. 14, 2020

(86) PCT No.: PCT/GB2020/050065
§ 371 (c)(1),
(2) Date: Jul. 28, 2021

(87) PCT Pub. No.: WO2020/157456
PCT Pub. Date: Aug. 6, 2020

(65) Prior Publication Data
US 2022/0087885 A1　　Mar. 24, 2022

(30) Foreign Application Priority Data
Jan. 29, 2019　(GB) .................................... 1901177

(51) Int. Cl.
*A61G 5/14*　　(2006.01)
*A61G 5/10*　　(2006.01)
*A61G 7/10*　　(2006.01)

(52) U.S. Cl.
CPC ............. *A61G 5/14* (2013.01); *A61G 5/1059* (2013.01); *A61G 7/1021* (2013.01); *A61G 7/103* (2013.01);
(Continued)

(58) Field of Classification Search
CPC ...... A61G 5/14; A61G 5/1059; A61G 7/1021; A61G 7/103; A61G 7/1034;
(Continued)

(56) References Cited

U.S. PATENT DOCUMENTS 5,735,002 A * 4/1998 Kistner .................. A61G 7/103
　　　　　　　　　　　　　　　　　　　　5/81.1 HS
7,305,726 B2　12/2007 Augustine et al.
(Continued)

FOREIGN PATENT DOCUMENTS

CN　　108245341 A * 7/2018 ............. A61G 7/103
DE　202014002472 U1 * 5/2014 ........... A61G 7/1021
(Continued)

OTHER PUBLICATIONS

UK Intellectual Property Office, Search Report regarding Application No. GB1901177.4, dated Jun. 21, 2019.
(Continued)

*Primary Examiner* — David R Hare
*Assistant Examiner* — Madison Emanski
(74) *Attorney, Agent, or Firm* — DUNLAP CODDING, P.C.

(57) ABSTRACT

An apparatus is disclosed which enables a person to be moved into a seat which may be obstructed by an arm rest or another obstacle. In some implementations, an apparatus for seating a person into an obstructed seat may comprise a
(Continued)

first support structure for supporting the person in a position adjacent the obstructed seat; a second support structure configured to be placed onto the seat; and a transfer structure configured to enable the person to move or be moved from the first support structure to the second support structure.

12 Claims, 5 Drawing Sheets

(52) U.S. Cl.
CPC ........ *A61G 7/1034* (2013.01); *A61G 2220/10* (2013.01)

(58) Field of Classification Search
CPC .............. A61G 2220/10; A61G 7/1032; A61G 2200/34; A61G 7/1003; A61G 7/1026; A61G 5/1045; A61G 7/1059; A61G 5/10; Y10S 297/04; Y10S 414/134; Y10S 297/08; B60N 2/245; A47C 7/021; A47C 3/38; A47C 3/30
USPC ......... 5/81.1 HS, 81.1 R, 86.1, 81.1 C, 84.1; 280/304.1; 4/480; 414/921; 297/154
See application file for complete search history.

(56) References Cited

U.S. PATENT DOCUMENTS

| | | | |
|---|---|---|---|
| 2006/0082210 A1* | 4/2006 | Fletcher | B60N 2/245 |
| | | | 297/452.41 |
| 2008/0052814 A1 | 3/2008 | Kaiwai | |
| 2013/0269101 A1* | 10/2013 | White | A61G 7/1026 |
| | | | 5/81.1 C |

FOREIGN PATENT DOCUMENTS

| | | | | |
|---|---|---|---|---|
| FR | 2 952 613 A1 | 5/2011 | | |
| GB | 2 110 527 A | 4/1982 | | |
| GB | 2166415 A | * 5/1986 | ............... A47C 3/30 |
| GB | 2 291 801 A | 2/1995 | | |
| GB | 2 300 845 A | 11/1996 | | |
| WO | WO 2018/218331 A1 | 12/2018 | | |

OTHER PUBLICATIONS

European Patent Office acting as the International Search Authority, International Search Report and Written Opinion regarding PCT App. No. PCT/GB2020/050065, mailed Apr. 7, 2020.

* cited by examiner

APPARATUS FOR SEATING A PERSON IN AN OBSTRUCTED SEAT

CROSS-REFERENCE TO RELATED APPLICATIONS

The present application is a 35 U.S.C. § 371 National Stage patent application of International Patent Application No. PCT/GB2020/050065 (Publication Number WO2020/157456A1), filed on Jan. 14, 2020, which claims priority to UK patent application GB 1901177.4, filed on Jan. 29, 2019. The entire contents of all of the above-referenced patent applications are hereby expressly incorporated by reference herein.

FIELD

The invention relates to an apparatus. Particularly, but not exclusively, the invention relates to an apparatus for seating a person into an obstructed seat.

BACKGROUND

For individuals in a wheelchair, flying on a commercial aircraft can be difficult as they cannot travel in their wheelchair as they need to be seated in one of the seats in the aircraft.

Currently, this involved two members of cabin crew where one lifts the individual from the back and one lifts from the front to place the individual in the respective seat. This often results in injury for both the cabin crew and the individual. It is also undignifying for the individual involved.

Aspects and embodiments were conceived with the foregoing in mind.

SUMMARY

Aspects relate to an apparatus which is suitable for seating a person onto a seat comprising at least one armrest or a seat where access to the seat is inhibited by an obstacle. An example of such a seat may be a seat on a commercial airliner. These seats can be difficult to access for a person with low mobility or a disability.

Viewed from a first aspect, there is provided an apparatus for seating a person into an obstructed seat, the apparatus comprising a first support structure for supporting the person in a position adjacent the obstructed seat, a second support structure configured to be placed onto the seat; and a transfer structure configured to enable the person to move or be moved from the first support structure to the second support structure.

Viewed from a second aspect, there is provided a method of seating a person into a seat comprising at least one armrest, the apparatus comprising moving a first support platform for supporting a passenger to a position adjacent the seat, adjusting the height of the first support platform to at least the height of the at least one armrest, adjusting the height of a second support platform placed onto the seat, wherein the height of the second support platform is adjusted to the height of the first support platform, moving the person from the first support platform onto the second support platform wherein the height of the second support platform is reduced to seat the person in the seat.

An obstructed seat is a seat where access to that seat is inhibited by, say, the presence of arm rests and/or other seats. That is to say, a seat where access to the seat is inhibited by an obstacle such as an arm rest, another seat, or a combination or both. A typical example of an obstructed seat may be an aircraft seat which is in a grouping of, say, two or three seats, where the passenger is being placed into a seat from an aisle where the obstruction is between the aisle and the seat.

Using an apparatus in accordance with the first aspect or a method in accordance with the second aspect enables a passenger to be moved into a seat where the seat may be obstructed by an armrest or other obstruction. The moving is achieved without manual lifting of the passenger.

The apparatus may further comprise a cushion which can be placed onto the first support structure under a person to be moved. The cushion can then provide support for the person as they are moved from the first support structure to the second support structure.

The first support structure may comprise a first support platform, wherein the first support structure may be configured to enable an adjustment in the height of the first support platform to lift the passenger to at least the height of the obstruction.

The second support structure may comprise a support platform, wherein the second support structure may be configured to enable an adjustment in the height of the second support platform to lift the height of the support platform to at least the height of the first support platform, wherein the height of the second support platform may be configured to be reduced which may be to lower the person into a seated position in the seat.

This enables a person to be seated in, say, a seat of an aircraft which may be difficult to access otherwise for a person who is bound to a wheelchair or who has low or inhibited mobility.

The apparatus may comprise a transfer platform configured to bridge a space between the first support platform and the second support platform to enable the person to be moved from the first support platform to the second platform.

The cushion may be used to support the person as they are moved along the transfer platform from the first support platform to the second support platform. The cushion may be positioned underneath the person on the first support platform before the seating process takes place and may remain under the person for the duration of the flight.

The transfer platform enables a space between the first and second support platforms to be bridged.

The transfer platform may comprise a mounting bracket for coupling the transfer surface to the wheelchair.

The transfer platform may be adjustable in length to enable a plurality of spaces to be bridged by the transfer platform.

This means that the transfer platform can be used to bridge spaces of many different sizes. This is useful, say, if the transfer platform is to be used to bridge both three and two seat seating arrangements on an aircraft.

The transfer platform may comprise a slider surface which is movable along the transfer platform to assist the movement of the person along the transfer platform when they are being moved from the first platform onto the second platform.

The effect of this feature is that a slider surface, such as, for example, a slide sheet, can be used to provide a low friction surface to assist the movement of the passenger along the transfer platform.

The slider surface may comprise a slider sheet which is mounted on at least a first set of rollers at a first end of the transfer platform.

The slider sheet may be further mounted to a second set of rollers placed at a second longitudinal end of the transfer platform.

The second support platform may comprise first and second sections.

The first section may comprise a pressure cushion to provide support for the person when they are in the seat. The effect of this is that the probability of the occurrence of pressure sores when the person is on the second support platform is reduced.

The second section may be inflatable to adjust the height of the second support platform to the height of the first support platform.

The second section may be connected to an air compressor to provide the air needed for the inflation of the second section.

The air compressor may be configured to receive a supply of electricity from an external power source.

The pressure cushion may be inflatable.

The pressure cushion may be connected to an air compressor to provide the air needed for the inflation of the pressure cushion.

The effect of using a pressure cushion is that the occurrence of pressure sores can be reduced on long journeys where the person is sat in the seat for a long time.

The air compressor may be configured to receive a supply of electricity from an external power source.

The first support platform may be mounted to a wheelchair.

BRIEF DESCRIPTION OF SEVERAL VIEWS OF THE DRAWINGS

An embodiment in accordance with the first and second aspects will now be described by way of example only and with reference to the following drawings in which.

DETAILED DESCRIPTION

Figure 1A:
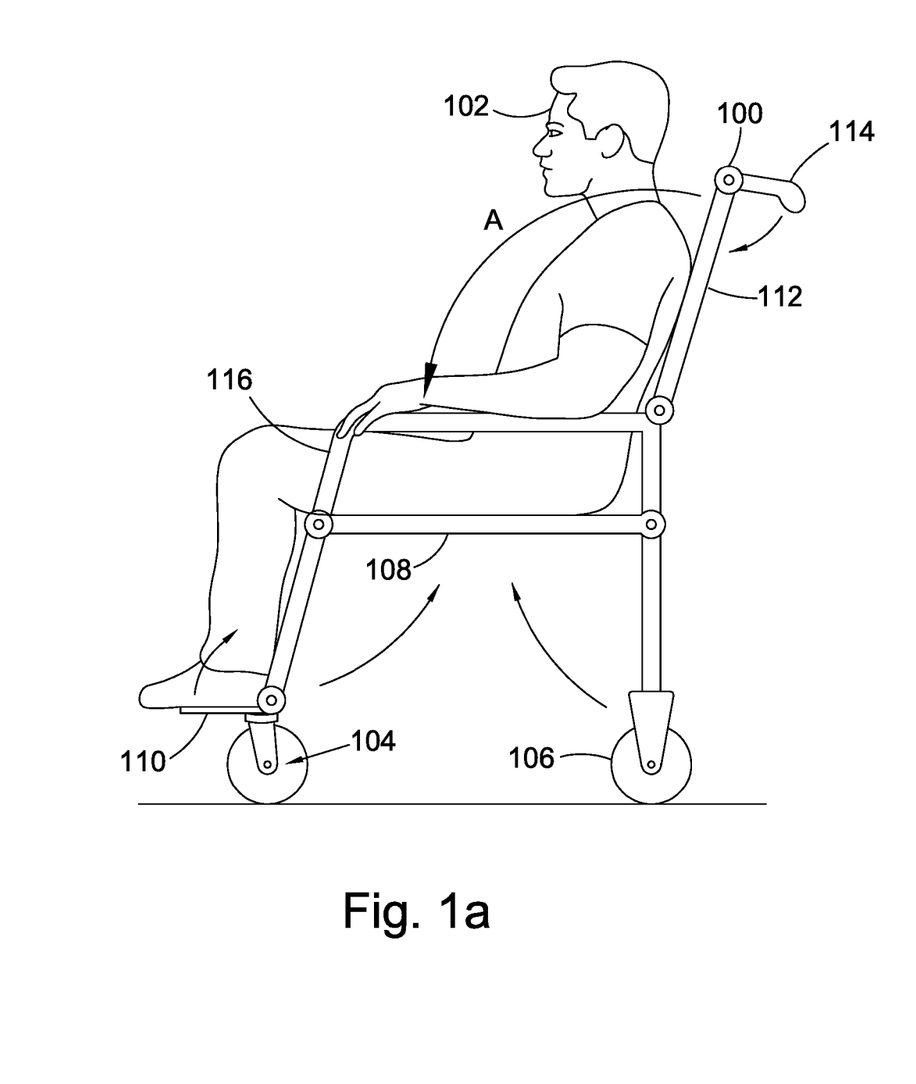
FIG. 1a illustrates a side view of a wheelchair used to seat a passenger on an aircraft seat.
Figure 1B:
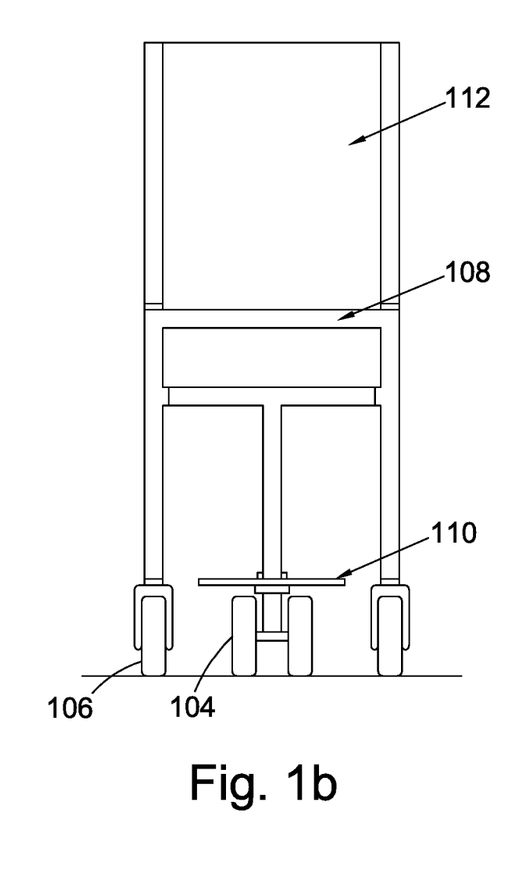
FIG. 1b illustrates a front end view of a wheelchair used to seat a passenger on an aircraft seat.

We now describe, with reference to FIGS. 1a and 1b, the use of a wheelchair 100 to board a passenger onto an aircraft.

FIG. 1a provides a side view of a wheelchair 100 used to seat a passenger 102 on an aircraft seat. Wheelchair 100 comprises a front set of castors 104 and a rear set of castors 106. Both the front set of castors 104 and the rear set of castors 106 can be folded away in the direction indicated by the arrow for storage. Wheelchair 100 is just an example of a wheelchair which can be used for the purposes of seating a passenger 102 into a seat on an aeroplane.

The wheelchair 100 comprises a seat 108 on which the passenger 102 is supported when they are being transported using the wheelchair 100. The passenger 102 rests their feet on footrests 110 which are foldable in the direction indicated by the arrow.

The wheelchair 100 further comprises a backrest 112 and handles 114. The handles 114 are used by a member of cabin crew who is responsible for seating the passenger 102. The member of cabin crew pushes the wheelchair 100 using the handles 114. The handles 114 are positioned at the end of backrest 112. The handles 114 are foldable in the direction indicated by the arrow.

In the seated position in the wheelchair 100, the passenger 102 is supported in the seated position by the backrest 112 which is also foldable in the direction indicated by arrow A. The arms of passenger 102 are supported by armrests 116.

The height $h_1$ of the seat 108 is adjustable in an upwards direction as indicated in FIG. 1b where the height $h_1$ of the seat 108 is at an elevated position relative to the FIG. 1a. This lifts the passenger 102 to an elevated position which is useful during the process of boarding the passenger on the aircraft using the apparatus we will now describe. That is to say, the height $h_1$ of the seat 108 is fixed at a height which is higher than the height of a seat on a conventional wheelchair.

The height adjustment of the seat 108 may be implemented using an electric motor (not shown) or any other suitable means. Alternatively, the wheelchair 100 may be made with the seat 108 statically positioned at the height indicated in FIG. 1b, which would be higher than the typical wheelchair. The height adjustable seat 108 is mounted to the wheelchair 100 using an appropriate coupling mechanism and may be detached from the wheelchair 100 if necessary.

Figure 2:
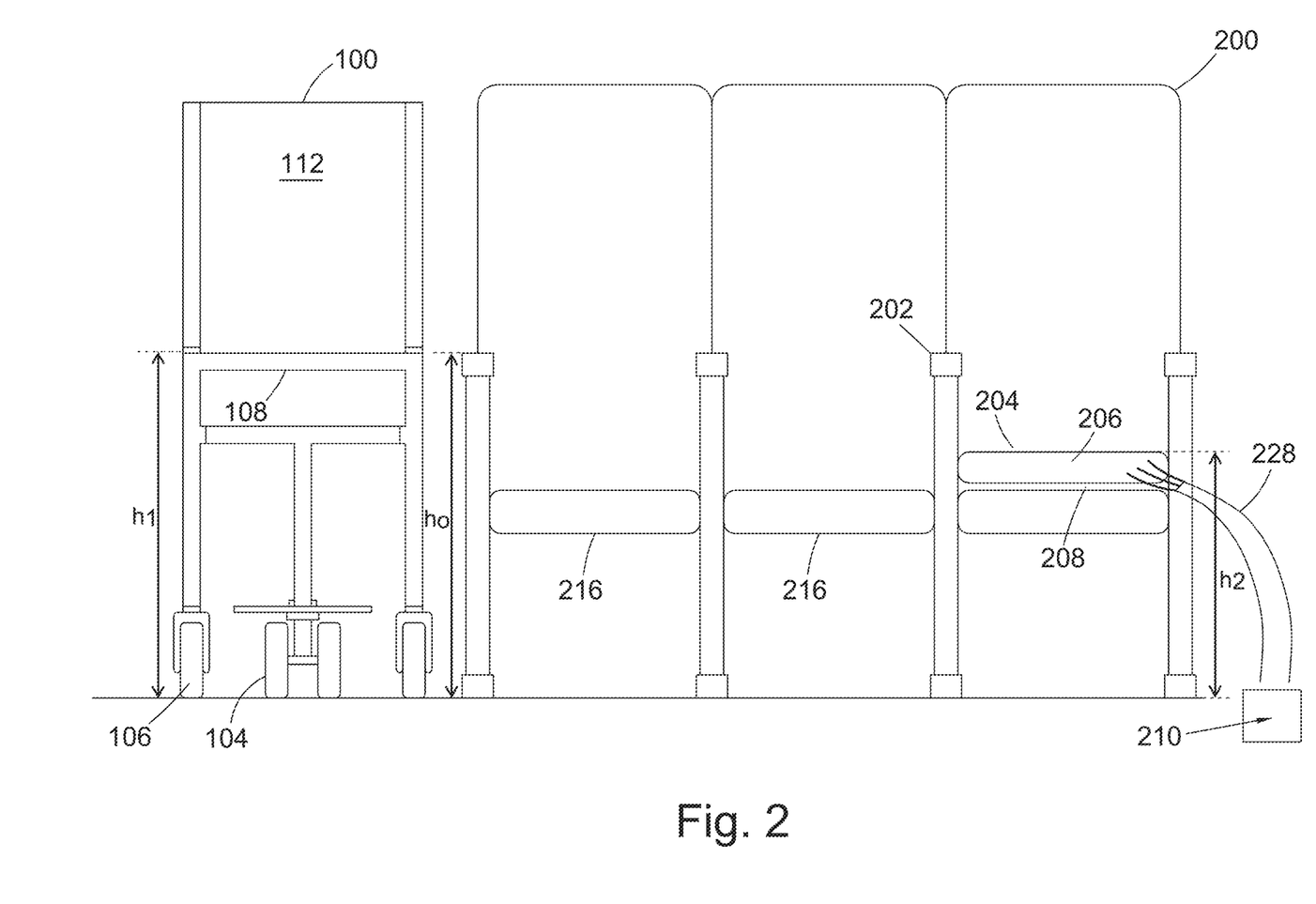
FIG. 2 illustrates a wheelchair in a position adjacent a row of seats on an aircraft.

We now describe, with reference to FIG. 2, how height adjustable seat 108 is used to seat a passenger 102 during the boarding process to seat the passenger 102 in a seat 200 on an aircraft.

Wheelchair 100 is pushed to a position in an aisle adjacent an aircraft seat 200, where seats 216 and an arm rest are obstructing access to seat 200. The height $h_1$ of the seat 108 is raised, electronically or otherwise, to a height which is equal to the height $h_o$ of the arm rest 202 of the seat 200. Alternatively, the height $h_1$ of the seat 108 may be fixed at a height which is equal to the height $h_o$ of the arm rest 202 of the seat 200.

Figure 3:
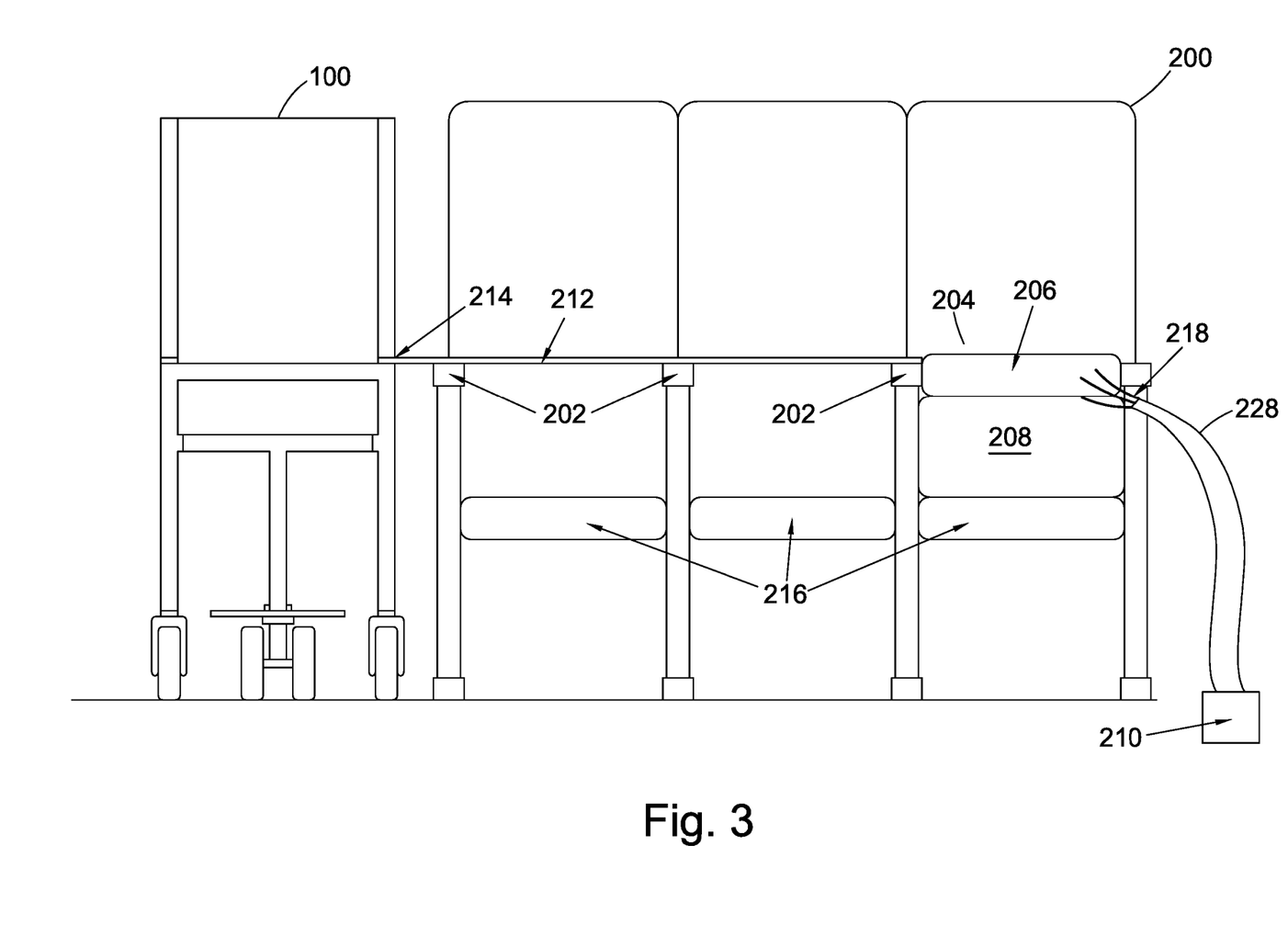
FIG. 3 illustrates the use of an apparatus in accordance with the embodiment.

Seat 200 is part of a group of three seats in an aircraft cabin, it may be a group of two seats and it may also be that the seat 200 is the seat nearest to the wheelchair 100 as illustrated in FIG. 2. In FIG. 3 we illustrate a group of three seats 216 where seat 200 is farthest away from the aisle in which the wheelchair 100 is positioned.

A passenger support arrangement 204 is positioned on the seat 200. The passenger support arrangement 204 comprises an upper section 206 and a lower section 208. The upper section 206 is connected to the lower section 208.

The upper section 206 is an air ripple cushion which is inflated by air supplied by a 12 v air compressor 210 using leads 228. Using an air ripple cushion provides pressure relief for the passenger sat on the seat 200 during a long journey, such as a long haul flight.

The upper section 206 is described in more detail with reference to FIG. 5

The lower section 208 is an inflatable body which is also connected to the 12 v air compressor 210. The lower section 208 is inflated using air from the air compressor 210 to raise the height $h_2$ of the passenger support arrangement 204 up to the height $h_o$ of the arm rest 202. That is to say, the passenger support arrangement 204 is elevated up to the height $h_1$ of the seat 108 due to the inflation of the lower section 208. This is illustrated in FIG. 3.

A transfer board 212 is attached to the armrest 116 of the wheelchair 100 using a clip 214 and is laid across the other two seats in the three seat arrangement 216 of aircraft seats. That is to say, the transfer board 212 bridges the gap between the seat 108 and the passenger support arrangement 204.

The arrangement provided by the apparatus illustrated with reference to FIGS. 2 and 3 enables a person to be moved from the seat 108 of the wheelchair to the passenger support arrangement 204. That is to say, a member of cabin crew can then assist the person as they can be moved along the transfer board 212 to a seated position on the passenger support arrangement 204 which is on seat 200. This can be done without lifting the passenger which is preferable for the passenger and preferable for the cabin crew.

A more able passenger can shuffle themselves along the transfer board 212 but the transfer board 212 may be itself configured to provide assistance to the less able passenger, as will be described with reference to FIG. 4.

Upon moving across the transfer board 212 or having been moved across the transfer board 212 to the passenger support arrangement 204, the passenger will be supported on the upper section 206.

The three-way valve 218 can then be activated to release air from lower section 208. This causes the air to be released from the lower section 208 and the height of the passenger support arrangement 204 is then reduced to lower the passenger into a seated position on the seat 200.

The passenger is then supported throughout the flight on the upper section 206 which forms a pressure cushion for the passenger. The upper section 206 is maintained in an inflated form by the air compressor 210 which is powered by the aircraft. Alternatively, the upper section 206 may be a foam based pressure cushion which does not require inflation. Alternatively, the upper section 206 may be a gel based pressure cushion which does not require inflation.

When the flight is over, the lower section 208 can be inflated again to lift the passenger up to an elevation which can be aligned with the seat 108 of wheelchair 100 and the process detailed above reversed to transfer the passenger from the seat 200 to the wheelchair 100 along the transfer board 212 so that they can be taken from the aircraft using wheelchair 100.

The use of the pressure cushion as a support surface for the passenger removes pressure points for the passenger and reduces the probability of the occurrence of pressure sores.

The transfer board 212 is of a length which is sufficient to bridge the gap between the wheelchair 100 and the seat 200. Many aircraft cabins have seat groupings of different sizes. Some seat groupings have 3 seats, as in FIGS. 2 and 3, and some others may have 2 seats or even 4 seats. The transfer board 212 may be adjustable in length to enable the apparatus to be used with seat groupings of different sizes. The transfer board 212 may be fixed and available in different lengths to enable it to be used with different seat groupings.

If the seat 200 is immediately next to the wheelchair 100 then it is possible that the transfer board 212 may not be necessary as the wheelchair 100 is so close to the seat 200 that the passenger can simply move from seat 108 to passenger support arrangement 204.

Figure 4:
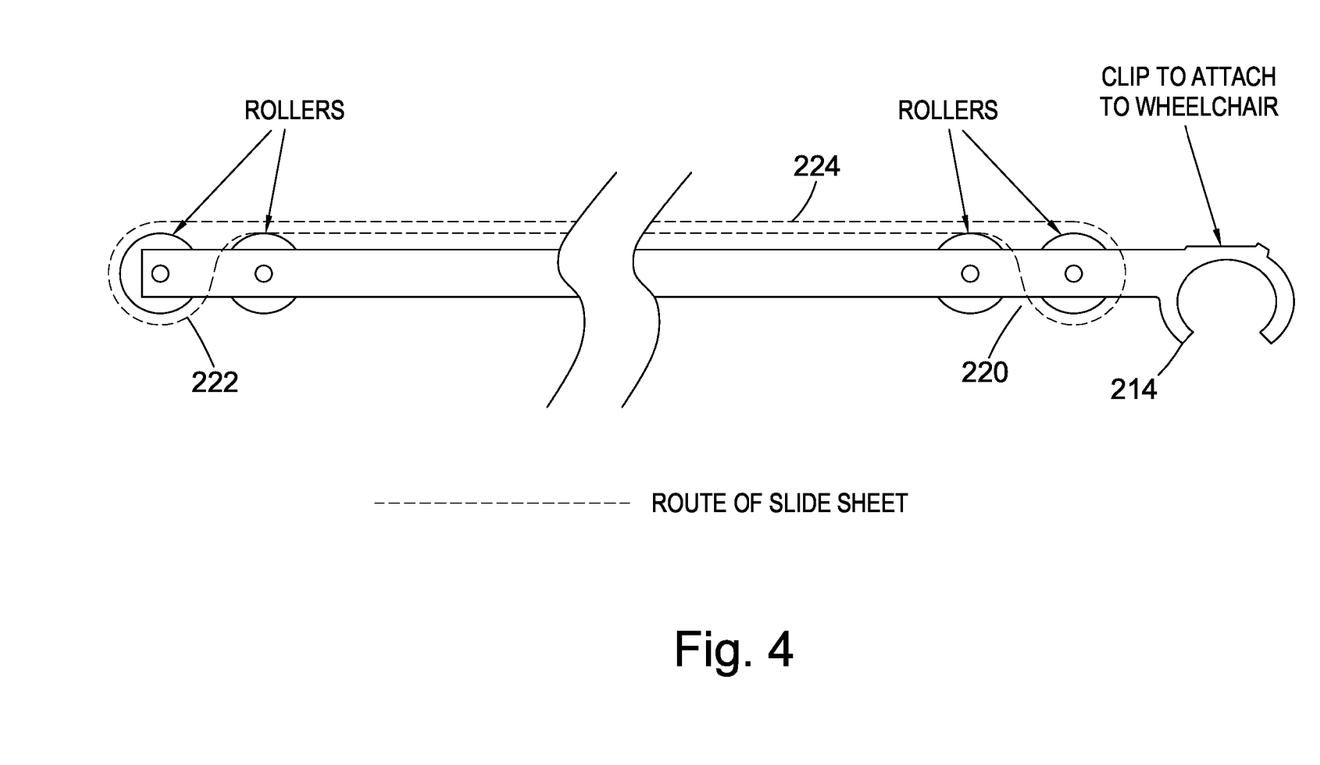
FIG. 4 illustrates a transfer board of an apparatus in accordance with the embodiment.

We now describe an example of the transfer board 212 in more detail with reference to FIG. 4.

The transfer board 212 comprises a clip 214 which enables the transfer board 212 to be attached to the wheelchair 100 when the passenger is being moved from the seat 108 to the passenger support apparatus 204.

The transfer board 212 comprises a first set of rollers 220 and a second set of rollers 222. A slide sheet 224 is routed around the first set of rollers 220 and the second set of rollers 222. The slide sheet 224 assists in the movement of the passenger along the transfer board 212 as it is made from low friction material such as low friction nylon. In order to realise different lengths of transfer board 212, the slider sheet 224 may be changed so that its length along the transfer board 212 can be extended The first set of rollers 220 and the second set of rollers 222 keep the slide sheet to the top of the transfer board 212 and prevent the slide sheet 224 from being caught on the arm rests of any of the seats in the seating group.

Using a transfer board 212 which utilises a slide sheet 224 means that even passengers with low mobility and physical ability can be seated with minimal effort.

In an alternative embodiment, the transfer board 212 may not use rollers or a slide sheet 224. Instead, a cushion may be provided which is positioned underneath the passenger at the start of the seating process, i.e. when they are positioned on the wheelchair 100, and then remain underneath the passenger during the seating process. The passenger may be pulled or pushed along transfer board 212 on the cushion from the seat 108 on the wheelchair 100 to the passenger support arrangement 204. Removing the need for rollers on the transfer board 212 simplifies the structure of the transfer board 212 and improves the comfort for the passenger.

That is to say, it is possible to transfer a passenger along the transfer board 212 between the wheelchair 100 and the passenger support arrangement 204 using just the cushion.

Figure 5:
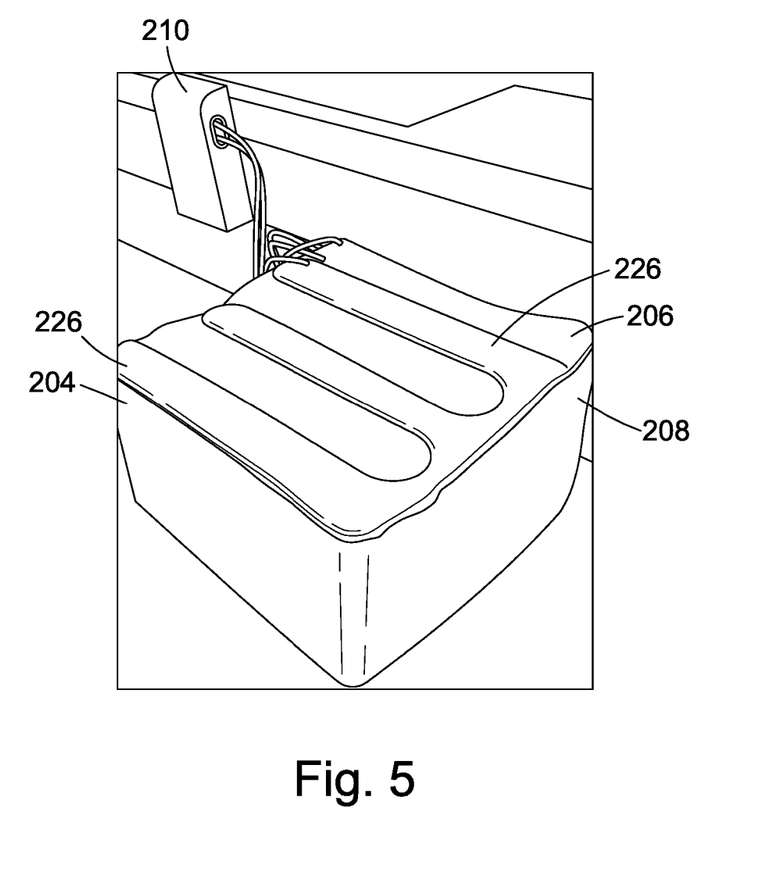
FIG. 5 illustrates an air cushion of an apparatus in accordance with the embodiment.

We now describe, with reference to FIG. 5, an example of passenger support arrangement 204.

Lower section 208 is inflatable through connection to air compressor 210 which causes the height of the passenger support arrangement 204 to be adjusted so that it can be aligned with the height of seat 108, as described with reference to FIGS. 2 and 3.

Upper section 206 comprises contoured sections 226 which improves comfort and removes pressure points and mitigates against the development of pressure sores. Parts of the upper section 206 may open and close during use to improve comfort.

The described apparatus enables cabin crew to move a passenger from a wheelchair into a seat on an aircraft, even if an arm rest or other seat is providing an obstruction. The apparatus enables the passenger to be moved without lifting.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:
1. An apparatus for seating a person into an obstructed seat, the apparatus comprising:
  a first support structure for supporting the person in a position adjacent the obstructed seat, the first support structure comprising a first support platform;

a second support structure configured to be placed onto the seat, the second support structure comprising a second support platform; and a transfer structure configured to enable the person to move or be moved from the first support structure to the second support structure, the transfer structure comprising a single transfer platform and a slider surface, wherein the single transfer platform is configured to bridge a space between the first support platform and the second support platform to enable the person to be moved from the first support platform to the second support platform on the single transfer platform, the single transfer platform having a first longitudinal end and a second longitudinal end and a length between the first longitudinal end and the second longitudinal end, wherein the length of the single transfer platform is adjustable to enable a plurality of spaces to be bridged by the single transfer platform, and wherein the slider surface is movable along the single transfer platform to assist movement of the person along the length of the single transfer platform when the person is being moved from the first support platform onto the second support platform, wherein the slider surface comprises an interchangeable slider sheet mounted on a first set of rollers placed at the first longitudinal end of the single transfer platform and on a second set of rollers placed at the second longitudinal end of the single transfer platform across the length of the single transfer platform.

2. The apparatus according to claim 1, wherein the first support structure is configured to enable an adjustment in a height of the first support platform to lift the person to at least a height of an obstruction of the seat.

3. The apparatus according to claim 1, wherein the second support structure is configured to enable an adjustment in a height of the second support platform to lift the height of the second support platform to at least a height of the first support platform.

4. The apparatus according to claim 1, wherein a height of the second support platform can be reduced to seat the person in the seat.

5. The apparatus according to claim 1, wherein the second support platform comprises first and second sections, and wherein the first section comprises a pressure cushion to provide support for the person when in the seat.

6. The apparatus according to claim 5, wherein the second section is inflatable to adjust a height of the second support platform to a height of the first support platform.

7. The apparatus according to claim 6, wherein the second section is connected to an air compressor to provide air for inflation of the second section.

8. The apparatus according to claim 5, wherein the pressure cushion is inflatable.

9. The apparatus according to claim 8, wherein the pressure cushion is connected to an air compressor to provide air for inflation of the pressure cushion.

10. The apparatus according to claim 1, wherein the first support structure is mounted to a wheelchair.

11. The apparatus according to claim 1, wherein the obstructed seat is an aircraft seat comprising at least one armrest.

12. The apparatus according to claim 1, wherein the first set of rollers and the second set of rollers are configured to route the slider sheet over the top of the single transfer platform.

* * * * *